(12) United States Patent
Qiu et al.

(10) Patent No.: US 11,808,914 B2
(45) Date of Patent: Nov. 7, 2023

(54) METHOD AND EQUIPMENT FOR TRANSFORMATION OF POINT CLOUD COORDINATES OF STRUCTURE PLANE OF DEEP-BURIED TUNNEL BASED ON TARGET DEVICE

(71) Applicants: Institute of Rock and Soil Mechanics, Chinese Academy of Sciences, Wuhan (CN); South-Central Minzu University, Wuhan (CN)

(72) Inventors: Shili Qiu, Wuhan (CN); Ping Li, Wuhan (CN); Shaojun Li, Wuhan (CN); Hao Zhang, Wuhan (CN); Dingping Xu, Wuhan (CN); Quan Jiang, Wuhan (CN)

(73) Assignees: Institute of Rock and Soil Mechanics, Chinese Academy of Sciences, Wuhan (CN); South-Central Minzu University, Wuhan (CN)

( * ) Notice: Subject to any disclaimer, the term of this patent is extended or adjusted under 35 U.S.C. 154(b) by 0 days.

(21) Appl. No.: 18/185,462

(22) Filed: Mar. 17, 2023

(65) Prior Publication Data

US 2023/0305183 A1    Sep. 28, 2023

(30) Foreign Application Priority Data

Mar. 25, 2022  (CN) .......................... 202210303074.7

(51) Int. Cl.
*G01V 8/10*    (2006.01)
(52) U.S. Cl.
CPC ............ *G01V 8/10* (2013.01); *G01V 2210/62* (2013.01)
(58) Field of Classification Search
CPC ................................................ G01V 2210/62
(Continued)

(56) References Cited

U.S. PATENT DOCUMENTS 7,180,072 B2 *  2/2007  Persi .......................... G06T 7/33
                                                  250/370.08
9,829,308 B2 * 11/2017  Stewart .................. G01B 11/24
(Continued)

FOREIGN PATENT DOCUMENTS

| CN | 108646259 A | 10/2018 |
| CN | 110332888 A | 10/2019 |
| CN | 111561908 A | 8/2020 |

OTHER PUBLICATIONS

Translation of Office Action for the corresponding Chinese Application No. 202210303074.7, dated Nov. 21, 2022 (Year: 2022).*

*Primary Examiner* — Mischita L Henson
(74) *Attorney, Agent, or Firm* — Nitin Kaushik (57) ABSTRACT

The embodiment of the present application discloses a method and equipment for transformation of point cloud coordinates of structure plane of deep-buried tunnel based on a target device. Before performing laser scanning on a measured surface, the embodiment of the present application makes the third plate surface close to the measured surface by adjusting the target device, and makes the bubbles of the first circular level and the second circular level in a centered state; respectively extracting point cloud coordinates of the three cross targets from the point cloud data, and acquiring the first tendency of the third plate surface from the digital display of three-dimensional electronic compass; determining the second tendency of the third plate surface according to the point cloud coordinates; converting the coordinates in the point cloud data to geodetic coordinates according to the first tendency and the second tendency.

9 Claims, 8 Drawing Sheets

(58) Field of Classification Search
  USPC .............................................................. 702/2
  See application file for complete search history.

(56) References Cited

U.S. PATENT DOCUMENTS

| | | | | |
|---|---|---|---|---|
| 10,830,889 B2* | 11/2020 | Santos | ................... | G01S 17/42 |
| 2014/0368378 A1* | 12/2014 | Crain | ................... | G01S 13/767 |
| | | | | 342/25 A |
| 2017/0205534 A1* | 7/2017 | Prikryl | ................... | E01C 23/01 |
| 2018/0087901 A1* | 3/2018 | Komeichi | ............ | G01C 15/002 |
| 2020/0182718 A1* | 6/2020 | Li | .......................... | G01S 17/88 |

* cited by examiner

METHOD AND EQUIPMENT FOR TRANSFORMATION OF POINT CLOUD COORDINATES OF STRUCTURE PLANE OF DEEP-BURIED TUNNEL BASED ON TARGET DEVICE

CROSS-REFERENCE TO RELATED APPLICATIONS

The application claims priority to Chinese patent application No. 2022103030747, filed on Mar. 25, 2022, the entire contents of which are incorporated herein by reference.

TECHNICAL FIELD

The present application relates to the technical field of measurement, and particularly relates to a method and equipment for transformation of point cloud coordinates of structure plane of deep-buried tunnel based on a target device.

BACKGROUND

In the geological survey of deep underground engineering, those located in high-stress tunnel, ultra-deep stope, and tunnel are all at high risk of rockburst, pressure bump, and collapse. Under the tunnel face or sidewall area and other similar environments, it is very dangerous to obtain the geological structure information of the excavation face, even to pay the cost of life.

Non-contact measurement is an effective method to solve this dilemma, such as three-dimensional laser scanning or photogrammetry to obtain point cloud information or image information of excavation surface but currently, and the point cloud information of tunnel wall surface obtained by three-dimensional laser scanning are based on the local coordinate system of three-dimensional laser scanner, in order to obtain structure plane occurrence and other geometric information through the point cloud information obtained by three-dimensional laser scanning, it is necessary to transform from the local coordinate system of a scanner to the geodetic coordinates system.

In general, it is necessary to determine the geodetic coordinates of not less than three known points under the assist of total station. Three or more targets are manually fixed on the measuring surface. After the total station determines the geodetic coordinates of the target points, the point cloud data is registered by means of the coordinate data of the targets, and all the point clouds are converted from the local coordinate system of the scanner to the geodetic coordinate system. In order to build a three-dimensional geological model, it is necessary to carry out the total station to measure enough measurement points to meet the work of point cloud data registration in the later stage, but this work is very tedious and time-consuming and needs multi-person cooperation, which violates the requirements of rapid measurement and reducing personnel exposure in the risk of extremely high rockburst, pressure bump or collapse.

Therefore, from the perspective of geological structure plane information acquisition, how to quickly and conveniently arrange the target device in the field, and how to quickly acquire information to realize the transformation from the local coordinate system of the three-dimensional laser scanning to the geodetic coordinate system is particularly important for the information acquisition of rapid excavation plane of deep engineering, and has important application value.

SUMMARY

The embodiments of the present application provide a method and equipment for transformation of point cloud coordinates of structure plane of deep-buried tunnel based on target device, which can quickly and conveniently arrange the target device in the field and quickly obtain information so as to realize the transformation from a coordinate of three-dimensional laser scanning to geodetic coordinates.

In the first aspect, the embodiments of the present application provide a method for transformation of point cloud coordinates structure plane of deep-buried tunnel based on target device, wherein the target device comprises a triangular target holder, a first plate surface, a second plate surface and a third plate surface, wherein:

the first plate surface and the second plate surface are in the shape of an isosceles triangle, the third plate surface is in the shape of an isosceles trapezoid, and the triangular target holder is successively provided with a holder foot, a first circular level, a height adjuster and a direction adjuster from bottom to top;

the triangular target holder is connected to the second plate surface via the direction adjuster, the bottom edge of the second plate surface is connected to the lower bottom of the third plate surface via a folding hinge, the upper bottom of the third plate surface is connected to the bottom edge of the first plate surface via a folding hinge, the first plate surface and the second plate surface are fixedly connected via a post holder, the second circular level is provided at the central position of the first plate surface, three cross targets are provided on the third plate surface, and a digital display of three-dimensional electronic compass is provided at the central position of the third plate surface;

before performing laser scanning on a measured surface, the third plate surface is close to the measured surface by adjusting the target device, and the bubbles of the first circular level and the second circular level are in a centered state;

acquiring point cloud data of the measured surface and the target device via a three-dimensional laser scanner;

respectively extracting point cloud coordinates of the three cross targets from the point cloud data, and acquiring the first tendency of the third plate surface from the digital display of a three-dimensional electronic compass;

determining the second tendency of the third plate surface according to the point cloud coordinates;

converting the coordinates in the point cloud data to geodetic coordinates according to the first tendency and the second tendency.

In some embodiments, determining the second tendency of the third plate surface according to the point cloud coordinates, which comprises:

determining the first normal vector of the third plate surface according to the point cloud coordinates;

determining the second tendency according to the first normal vector;

determining the second tendency according to the first normal vector.

In some embodiments, determining the second tendency according to the first normal vector, which comprises:

determining the second tendency according to the first normal vector and a preset tendency calculation formula, wherein the first normal vector is ($a_1$, $b_1$, $c_1$), wherein:

when $b_1 > 0$, the tendency calculation formula is:

$$\alpha_1 = \arccos\left(\frac{a_1}{\sqrt{a_1^2 + b_1^2}}\right),$$

wherein $\alpha_1$ is the second tendency;

when $b_1 \leq 0$, the tendency calculation formula is:

$$\alpha_1 = 2\pi - \arccos\left(\frac{a_1}{\sqrt{a_1^2 + b_1^2}}\right).$$

In some embodiments, converting the coordinates in the point cloud data to geodetic coordinates according to the first tendency and the second tendency, which comprises:

determining the tendency difference according to the first tendency and the second tendency;

converting the coordinates in the point cloud data into geodetic coordinates according to the tendency difference and a preset coordinate conversion formula, wherein the coordinate conversion formula is:

$$(x'\ y'\ z'\ 1) = (x\ y\ z\ 1)\begin{bmatrix} \cos\alpha & 0 & \sin\alpha & 0 \\ 0 & 1 & 0 & 0 \\ \sin\alpha & 0 & \cos\alpha & 0 \\ 0 & 0 & 0 & 1 \end{bmatrix};$$

wherein (x' y' z') is geodetic coordinate, (x y z) is coordinate in the point cloud data, and $\Delta\alpha$ is the tendency difference.

In some embodiments, after converting the coordinates in the point cloud data to geodetic coordinates according to the first tendency and the second tendency, the method further comprises:

extracting triangle coordinates from the geodetic coordinates;

calculating the second normal vector of the triangle coordinates;

determining the third tendency according to the second normal vector and a preset tendency calculation formula.

In some embodiments, after calculating the second normal vector of the triangle coordinates, the method further comprises:

determining the inclination angle of the triangle coordinates according to the second normal vector and a preset calculation formula of inclination angle, wherein the second normal vector is ($a_2$, $b_2$, $c_2$), wherein:

the calculation formula of inclination angle is:

$$\beta = \arctan\left(\frac{\sqrt{a_2^2 + b_2^2}}{c_2}\right),$$

wherein $\beta$ is the inclination angle of the triangle coordinates.

In some embodiments, the direction adjuster comprises a screw bolt, a lower base, a foot screw, and an upper base, wherein the screw bolt is connected to the lower base, the lower base is connected to the foot screw, the foot screw is connected to the upper base, and the upper base is connected to the second plate surface by a fixing rod.

In a second aspect, the embodiments of the present application also provide a device for transformation of point cloud coordinates of structure plane of deep-buried tunnel based on a target device, comprising a target device, a three-dimensional laser scanner, and a processing device, wherein:

the target device comprises a triangular target holder, a first plate surface, a second plate surface, and a third plate surface, wherein:

the first plate surface and the second plate surface are in the shape of an isosceles triangle, the third plate surface is in the shape of an isosceles trapezoid, and the triangular target holder is successively provided with a holder foot, a first circular level, a height adjuster and a direction adjuster from bottom to top;

the triangular target holder is connected to the second plate surface via the direction adjuster, the bottom edge of the second plate surface is connected to the lower bottom of the third plate surface via a folding hinge, the upper bottom of the third plate surface is connected to the bottom edge of the first plate surface via a folding hinge, the first plate surface and the second plate surface are fixedly connected via a post holder, the second circular level is provided at the central position of the first plate surface, three cross targets are provided on the third plate surface, and a digital display of three-dimensional electronic compass is provided at the central position of the third plate surface;

before performing laser scanning on a measured surface, the third plate surface is close to the measured surface by adjusting the target device, and the bubbles of the first circular level and the second circular level are in a centered state;

the three-dimensional laser scanner is used for acquiring point cloud data of the measured surface and the target device;

the processing device is used for respectively extracting point cloud coordinates of the three cross targets from the point cloud data, and acquiring the first tendency of the third plate surface from the digital display of three-dimensional electronic compass; determining the second tendency of the third plate surface according to the point cloud coordinates; converting the coordinates in the point cloud data to geodetic coordinates according to the first tendency and the second tendency.

In a third aspect, the embodiments of the present application also provide an equipment for transformation of point cloud coordinates of structure plane of deep-buried tunnel based on a target device, comprising a target device, a three-dimensional laser scanner, and a processing device, wherein the processing device comprises a memory and a processor, wherein a computer program is stored in the memory, and the processor executes the steps in the method for transformation of point cloud coordinates of structure plane of deep-buried tunnel based on a target device of any of those provided in this application embodiment when calling the computer program in the memory.

In a fourth aspect, the embodiments of the present application also provide a computer-readable storage medium stored a plurality of instructions adapted to be loaded by a processor to perform the method for transformation of point cloud coordinates of structure plane of deep-buried tunnel based on a target device of any of those provided in this application embodiment.

In the embodiments of the present application, before performing laser scanning on a measured surface, the third plate surface is close to the measured surface by adjusting the target device, and the bubbles of the first circular level and the second circular level are in a centered state; acquiring point cloud data of the measured surface and the target device via a three-dimensional laser scanner; respectively extracting point cloud coordinates of the three cross targets from the point cloud data, and acquiring the first tendency of the third plate surface from the digital display of three-dimensional electronic compass; determining the second tendency of the third plate surface according to the point cloud coordinates; converting the coordinates in the point cloud data to geodetic coordinates according to the first tendency and the second tendency. In this scheme, the target device can be quickly and conveniently arranged in the field, and the information can be quickly obtained so as to realize the transformation from the coordinate of three-dimensional laser scanning to the geodetic coordinates.

BRIEF DESCRIPTION OF DRAWINGS

In order to more clearly illustrate the technical solutions in the embodiments of the present application, a brief description of the accompanying diagrams used in the description of the embodiments is given below; obviously, the accompanying diagrams in the description below are merely some embodiments of the present application, and for technicians in this field, other accompanying diagrams can be obtained according to these accompanying diagrams without involving any inventive effort.

DETAILED DESCRIPTION OF THE EMBODIMENTS

The embodiments of the present invention will now be described more fully hereinafter with reference to the accompanying diagrams, in which some, but not all embodiments of the invention are shown. Based on the embodiments of the present application, all other embodiments obtained by those skilled in this field without involving any inventive effort are within the scope of the present application.

In the following description, specific embodiments of the present application are described with reference to steps and symbols performed by one or more computers, unless otherwise indicated. Accordingly, these steps and operations will be referred to several times as being performed by a computer, which as referred to herein includes operations performed by a computer processing unit representing electronic signals in a structured form of data. This operation transforms the data or maintains it at a location in the computer's memory system, which may reconfigure or otherwise alter the operation of the computer in a manner well-known to those skilled in the art. The data structure maintained by the data is a physical location of the memory having certain characteristics defined by the data format. However, the principles of the present application have been described in the foregoing text, it is not intended to be limiting, and those skilled in the art will appreciate that the various steps and operations described below may be implemented in hardware.

The principles of the present application operate using many other general-purpose or special-purpose computing, communication environments, or configurations. Examples of well-known computing systems, environments, and configurations that may be suitable for use with the invention include, but are not limited to, hand-held phones, personal computers, servers, multiprocessor systems, microcomputer-based systems, mainframe computers, and distributed computing environments that include any of the above systems or devices.

The terms "first", "second", "third", and the like in the present application are used to distinguish between different objects and are not used to describe a particular order. Furthermore, the terms "comprise" and "have", as well as any variations, are intended to cover a non-exclusive inclusion.

The present application provides a method for transformation of point cloud coordinates of structure plane of deep-buried tunnel based on a target device, and the method needs to be in combination with the target device, a three-dimensional laser scanner, and a processing device.

Figure 1:
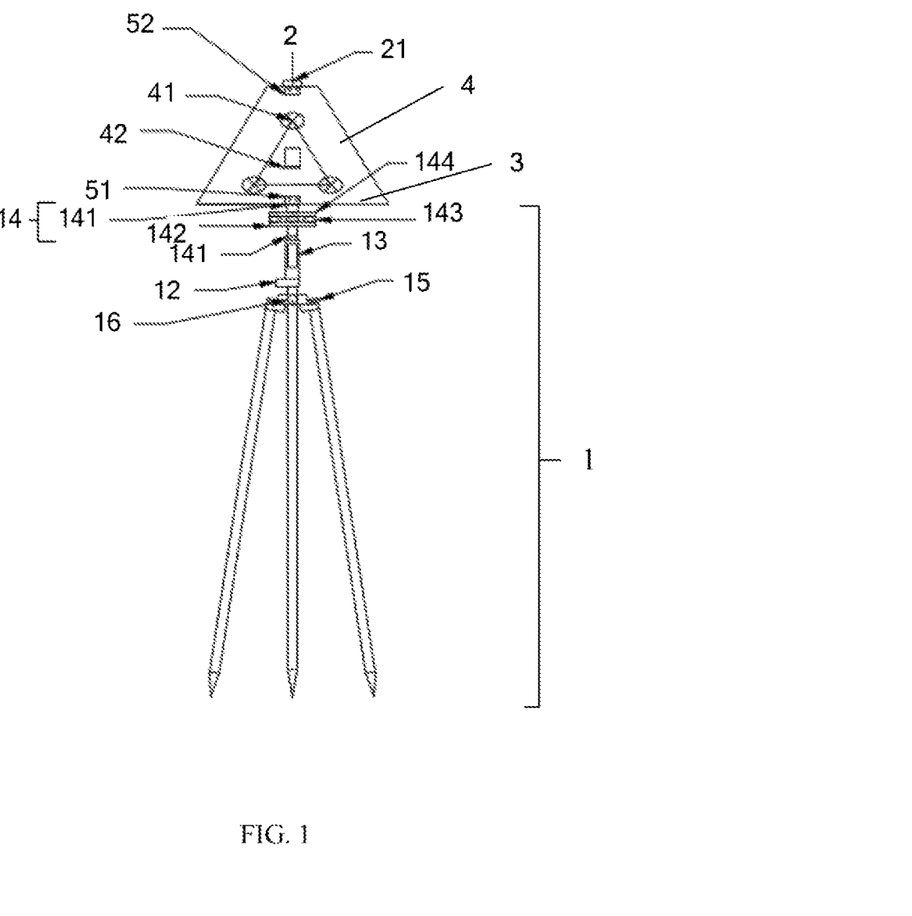
FIG. 1 is a schematic structural view of a target device provided by an embodiment of the present application.

Wherein, as shown in FIG. 1, FIG. 1 is a schematic structural view of a target device provided in the present application, and the target device comprises a triangular target holder 1, a first plate surface 2, a second plate surface 3, and a third plate surface 4, wherein:

the first plate surface 2 and the second plate surface 3 are in the shape of an isosceles triangle, the third plate surface 4 is in the shape of an isosceles trapezoid, and the triangular target holder 1 is successively provided with a holder foot 11, a first circular level 12, a height adjuster 13 and a direction adjuster 14 from bottom to top;

the triangular target holder 1 is connected to the second plate surface 3 via a direction adjuster 14, the bottom edge of the second plate surface 3 is connected to the lower bottom of the third plate surface 4 via a folding hinge 51, the upper bottom of the third plate surface 4 is connected to the bottom edge of the first plate surface 2 via a folding hinge 52, the first plate surface 2 and the second plate surface 3 are fixedly connected via a post holder, the central position of the first plate surface 2 is provided with a second circular level 21, the third plate surface 4 is provided with three cross targets 41, and the central position of the third plate surface 4 is provided with the digital display of a three-dimensional electronic compass 42;

the direction adjuster 14 comprises a screw bolt 141, a lower base 142, a foot screw 143, and an upper base 144, wherein the screw bolt 141 is connected to the lower base 142, the lower base 142 is connected to the foot screw 143, the foot screw 143 is connected to the upper base 144, the upper base 144 is connected to the second plate surface 3 via a fixing rod, and the height adjuster 13 is placed at a midline position intermediate the screw bolt 141 and the first circular level 12.

The holder feet of the triangular target holder 1 have three holder feet, comprising one fixed holder foot and two adjustable holder feet, wherein the upper part of the adjustable holder feet is provided with an auxiliary target adjusting button 15, and the fixed holder foot is provided with a main elastic target holder screw 16.

The cross target 41 in the target device needs to be placed on the measured surface in the process of three-dimensional laser scanning, but it is often not easy to place the cross target because the measured surface may be on high and steep rock mass or be under dangerous rock mass. In addition, when the cross target is placed on the measured surface, the tendency and inclination angle of the measured surface need to be measured manually using the geological compass, which not only requires manual operation but also has a certain error in the measured tendency and inclination angle.

Therefore, prior to performing laser scanning on the measured surface in the present application, the target device is adjusted so that the third plate surface 4 is close to the measured surface and the bubbles of the first circular level 12 and the second circular level 21 are in a central state, wherein the measured surface in the present embodiment may be a bare wall surface of a tunnel. In the present application, it is not necessary to directly provide a target device on the measured surface, it is only necessary to place the target device on the ground, and then by adjusting the device to be measured, so that the third plate surface 4 of the device to be measured is close to the measured surface, the occurrence information of the measured surface is calculated by testing the occurrence information of the third plate 4.

It needs to be stated that the first circular level 12 and the second circular level 21 in the present application can quickly adjust the level, a cross target can be quickly marked on the measured surface via the third plate surface 4, the first plate surface 2, the second plate surface 3 and the third plate surface 4 are conveniently carried, the triangular target holder 1 is an adjustable triangular target holder, a digital display of three-dimensional electronic compass 42 can quickly acquire the tendency and inclination angle information of the third plate surface 4, and a target can be quickly and safely set during a three-dimensional laser scanning process via the above-mentioned components. It is an auxiliary tool for converting from the local coordinate of the scanner to the relative geodetic coordinate of the point cloud data in three-dimensional laser scanning.

In particular, rapid leveling of the lower base 142 may be achieved by the middle first circular level 12 by means of an adjustable triangular target holder. The lower base 142 and the target component adopt a separate assembly mode, and the target component (the first plate surface 2, the second plate surface 3, and the third plate surface 4, etc.) can be quickly mounted on the lower base 142, and the forward direction of the target can be freely adjusted, so as to facilitate the three-dimensional laser scanner to directly irradiate the cross target to acquire target feature points. The target component is placed on the triangular target holder 1, and three foot screws 143 on the triangular target holder 1 can achieve rapid leveling and fine leveling of the target component, specifically, achieving leveling of the upper base 144 via the first circular leveler 12; and the method is rotating the two foot screws 143 so that the plane of the first circular level 12 is parallel to any pair of foot screws 143; then, another foot screw 143 is rotated to center the long bubble tube bubble of the first circular level 12. The third plate surface 4 of the target component is folded, and a digital display of three-dimensional electronic compass 42 is arranged thereon, so as to accurately read the occurrence data (including tendency and inclination angle) of the third plate 4 of No. 3.

It can be seen that in the present application, the occurrence information of the third plate surface 4 can be acquired via the target device, and the point cloud is converted from the scanner coordinate system to the geodetic coordinate system via the occurrence information. In the present application, only one target device of the present application needs to be arranged when realizing the conversion of a point cloud from a scanner coordinate system to a geodetic coordinate system, so as to reduce the exposure time of personnel in a deep dangerous tunnel section and achieve the purpose of rapidly acquiring exposed wall information about a tunnel. In addition, the method eliminates the complicated process of total station measurement and only needs a three-dimensional laser scanner to scan the target device of the present application together with the rock wall (measured surface) of the tunnel to be measured, so as to achieve optimization in operation speed and measurement accuracy.

The three-dimensional laser scanning technology is an advanced and fast three-dimensional scanning technology for obtaining the occurrence information of the structure plane. The three-dimensional laser scanning technology can scan the encoded pulse laser beam through the reflecting prism at a high-speed and orderly line by line across the surface of the object to be measured by emitting the pulse laser. The laser receiver records the time taken for each laser pulse from emission to reflection and the emission angle of each laser pulse, calculates the three-dimensional coordinates of the laser point on the object to be measured by using the time principle, and then converts the local coordinates into geodetic coordinates by using three cross targets placed in the scanning area in advance as control points as the connection points of point cloud splicing. The point cloud data can be accurately spliced.

Figure 2:
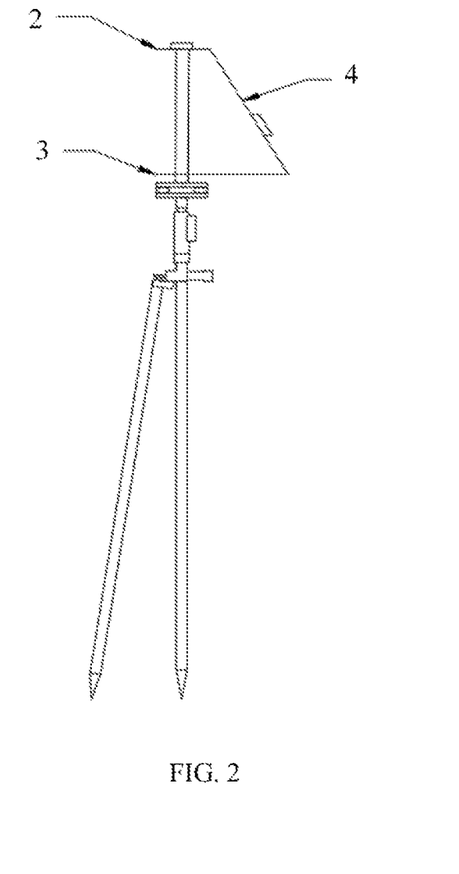
FIG. 2 is a schematic side view of a target device provided by an embodiment of the present application.
Figure 3:
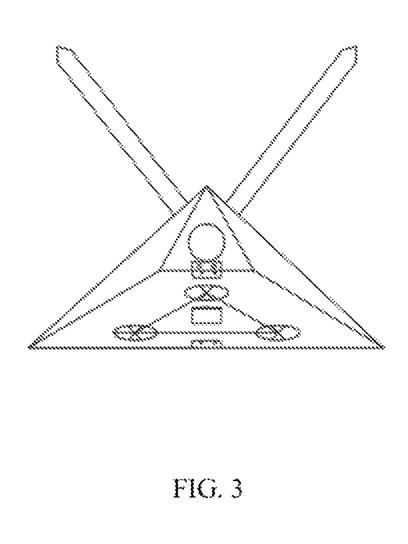
FIG. 3 is a schematic top view of a target device provided by an embodiment of the present application.
Figure 4:
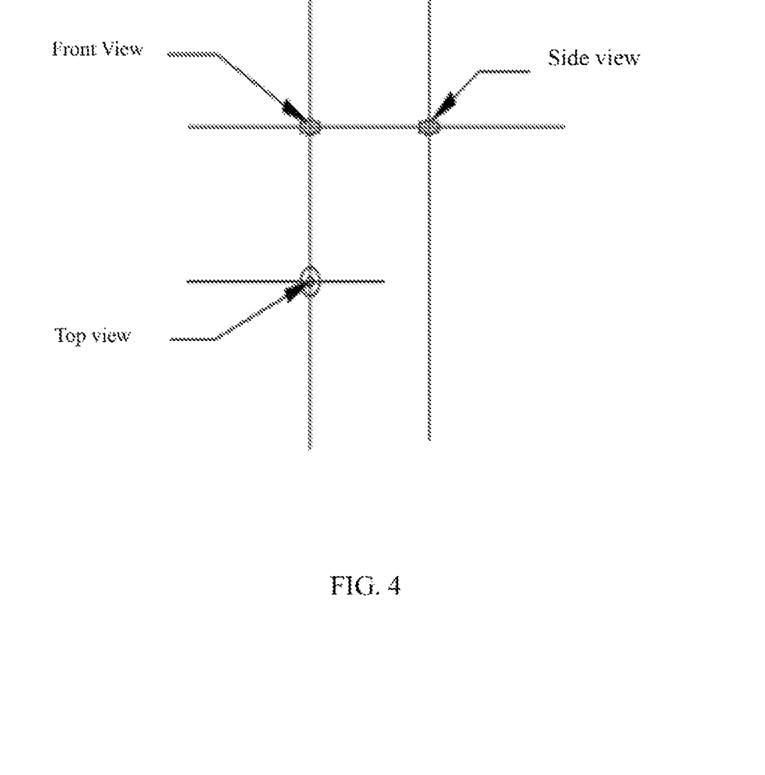
FIG. 4 is a front view, a side view, and a top view of a foot screw in a target device provided by an embodiment of the present application.

For a further understanding of the target device provided herein, reference is made to FIG. 2, which is a side view of the target device of the present application, to FIG. 3, which is a top view of the target device of the present application, and to FIG. 4, which is a front view, a side view and a top view of the foot screw 143 of the target device of the present application.

Figure 5:
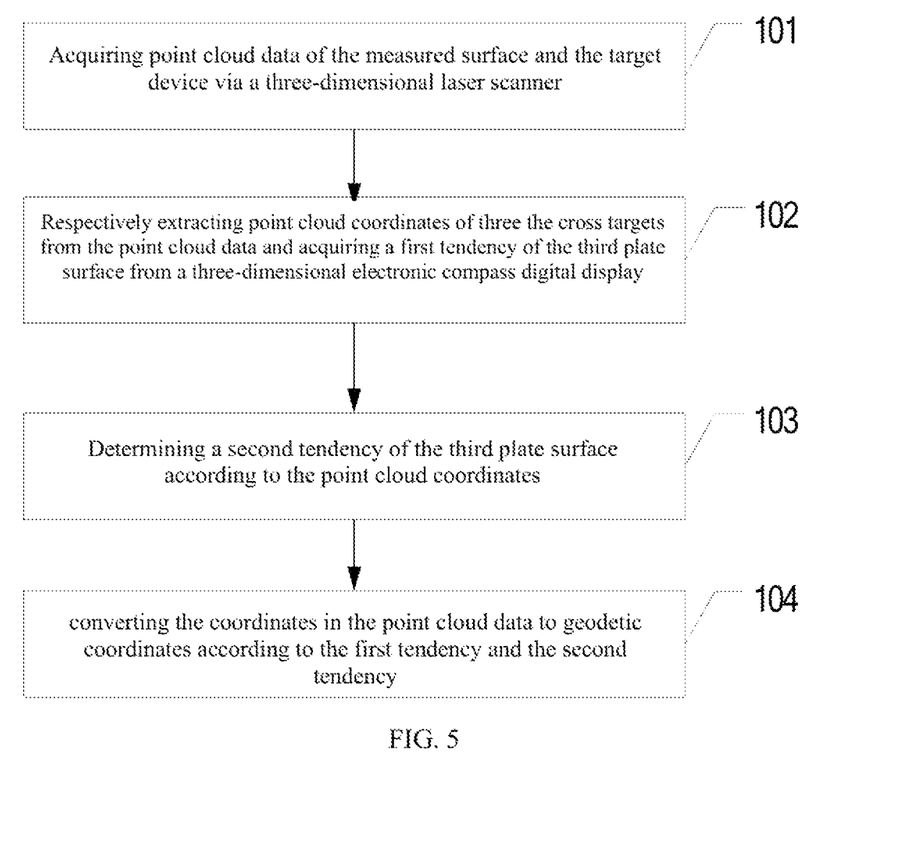
FIG. 5 is a schematic flow chart of a method for transformation of point cloud coordinates of structure plane of deep-buried tunnel based on a target device provided by an embodiment of the present application.

With reference to FIG. 5, FIG. 5 is a schematic flow chart of a method for transformation of point cloud coordinates of structure plane of deep-buried tunnel based on a target device provided in one embodiment of the present application. The execution main body of the method for transformation of point cloud coordinates of structure plane of deep-buried tunnel based on a target device can be the equipment for transformation of point cloud coordinates of structure plane of deep-buried tunnel based on a target device provided in the embodiment of the present application, or an equipment integrating the device for transformation of point cloud coordinates of structure plane of deep-buried tunnel based on a target device, wherein the device for transformation of point cloud coordinates of structure plane of deep-buried tunnel based on a target device can be implemented in hardware or software. In the example, before taking the point cloud data of the measured surface by the three-dimensional laser scanner, the third plate surface 4 on the target device needs to be adjusted to be close to the measured surface and the bubbles of the first circular level 12 and the second circular level 21 are in a central state so as to execute the method for transformation of point cloud coordinates of structure plane of deep-buried tunnel based on a target device in the present application, and in particular, the method for transformation of point cloud coordinates of structure plane of deep-buried tunnel may comprise:

101. Acquiring point cloud data of the measured surface and the target device via a three-dimensional laser scanner.

In this embodiment, when the third plate surface 4 on the target device is adjusted to be close to the measured surface, the three-dimensional laser scanner needs to acquire the point cloud data of the measured surface and the target device together.

102. Respectively extracting point cloud coordinates of the three cross targets from the point cloud data, and acquiring the first tendency of the third plate surface from the digital display of three-dimensional electronic compass.

Figure 6:
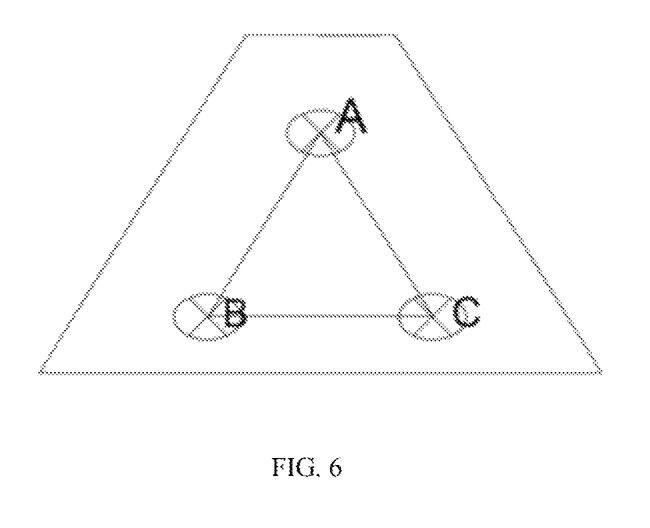
FIG. 6 is a schematic structural view of a cross target on the third plate surface provided by an embodiment of the present application.

In this embodiment, after the point cloud data of the measured surface and the target device are acquired, three cross targets 41 on the third plate surface 4 are extracted from the acquired point cloud data, as shown in FIG. 6, the three cross targets are targets A, B, and C, and the coordinates are A $(X_A, Y_A, Z_A)$, B $(X_B, Y_B, Z_B)$ and C $(X_C, Y_C, Z_C)$, respectively.

Here, the cross target in this embodiment may be a black-and-white cross target.

Furthermore, the first tendency of the third plate surface 4 needed to be acquired from the digital display of three-dimensional electronic compass 42.

In some embodiments, it may also be desirable to obtain the first inclination angle of the third plate surface 4 from the digital display of three-dimensional electronic compass 42.

103. Determining the second tendency of the third plate surface according to the point cloud coordinates.

In this embodiment, the second tendency of the third panel 4 can be determined according to the acquired point cloud coordinates of the three cross targets, and the specific method comprises:

1. Determining the first normal vector of the third plate surface according to the point cloud coordinates.

The calculation formula of normal vector is:

$$\overline{ab} = \left(\frac{X_l - X_A}{|AB|}, \frac{y_8 - y_A}{|AB|}, \frac{Z_g - Z_T}{|AB|}\right)$$

$$\overline{ac} = \left(\frac{X_c - X_A}{|AC|}, \frac{Y_C - Y_A}{|AC|}, \frac{Z_c - Z_A}{|AC|}\right)$$

$$\overline{ad} = \overline{ab} \times \overline{ac}$$

Where $\overline{ab}$ and $\overline{ac}$ is the unit vectors of the vectors AB and AC, and $\overline{ad}$ is the first normal vector of the third panel 4.

2. Determining the second tendency according to the first normal vector.

Specifically, determining the second tendency according to the first normal vector and a preset tendency calculation formula, wherein the first normal vector is $(a_1, b_1, c_1)$, wherein:

when $b_1 > 0$, the tendency calculation formula is:

$$\alpha_1 = \arccos\left(\frac{a_1}{\sqrt{a_1^2 + b_1^2}}\right),$$

wherein $\alpha_1$ is the second tendency;
the calculation formula of inclination angle is:

$$\beta_1 = \arctan\left(\frac{\sqrt{a_1^2 + b_1^2}}{c}\right),$$

wherein $\beta_1$ is the second inclination angle;
when $b_1 \leq 0$, the tendency calculation formula is:

$$\alpha_1 = 2^\pi - \arccos\left(\frac{a_1}{\sqrt{a_1^2 + b_1^2}}\right);$$

the calculation formula of inclination angle is:

$$\beta_1 = \arctan\left(\frac{\sqrt{a_1^2 + b_1^2}}{c}\right).$$

converting the coordinates in the point cloud data to geodetic coordinates according to the first tendency and the second tendency.

Specifically, converting the coordinates in the point cloud data to geodetic coordinates according to the first tendency and the second tendency comprises:

determining the tendency difference according to the first tendency and the second tendency;

The tendency difference $\Delta\alpha = \alpha - \alpha_1$, wherein $\alpha$ is a value read from the digital display of three-dimensional electronic compass 42.

Then converting the coordinates in the point cloud data into geodetic coordinates according to the tendency difference and a preset coordinate conversion formula, wherein the coordinate conversion formula is:

$$(x' \ y' \ z' \ 1) = (x \ y \ z \ 1) \begin{bmatrix} \cos\alpha & 0 & \sin\alpha & 0 \\ 0 & 1 & 0 & 0 \\ \sin\alpha & 0 & \cos\alpha & 0 \\ 0 & 0 & 0 & 1 \end{bmatrix};$$

wherein $(x' \ y' \ z')$ is geodetic coordinate, $(x \ y \ z)$ is coordinate in the point cloud data, and Da is the tendency difference.

After converting the coordinates in the point cloud data to geodetic coordinates according to the first tendency and the second tendency, the method further comprises:

Extracting the triangle coordinates from the geodetic coordinates; under the geodetic coordinates, calculating the normal vector of three point coordinates constituting each individual triangle from the above-mentioned normal vector calculation formula, tendency calculation formula, and calculation formula of inclination angle, and then calculating the tendency and inclination angle.

Specifically: extracting triangle coordinates from the geodetic coordinates; calculating the second normal vector of the triangle coordinates; determining the third tendency according to the second normal vector and a preset tendency calculation formula, wherein the second normal vector is $(a_2, b_2, c_2)$.

when $b_2 > 0$, the tendency calculation formula is:

$$\alpha_2 = \cos\left(\frac{a_2}{\sqrt{a_2^2 + b_2^2}}\right),$$

wherein $\alpha_2$ is the second tendency;

when $b_2 \leq 0$, the tendency calculation formula is:

$$a_2 = 2^\pi - \arccos\left(\frac{a_2}{\sqrt{a_2^2 + b_2^2}}\right);$$

determining the inclination angle of the triangle coordinates according to the second normal vector and a preset calculation formula of inclination angle, wherein:

at this time, the calculation formula of inclination angle is:

$$\beta_2 = \arctan\left(\frac{\sqrt{a_2^2 + b_2^2}}{c_2}\right),$$

wherein $\beta_2$ is the third inclination angle of the triangle coordinates, i.e. the inclination angle at the geodetic coordinate.

The present application uses the rapid arrangement and measurement of the auxiliary target device to realize the conversion of the point cloud data acquired by the three-dimensional laser scanning from the local coordinate of the scanner to the relative geodetic coordinate system, so as to replace the method registering the coordinate after carrying out a sufficient number of measurement points by the total station in the traditional method, so as to meet the requirements of rapidly implementing the three-dimensional laser scanning and accurately acquiring the point cloud information in an operating environment with extreme risks of rock burst and collapse in deep underground engineering. Point cloud data in the local coordinate system of the scanner system is transformed to the relative geodetic coordinate system through an auxiliary target. The present application proposes a technical method for supporting an auxiliary target to realize coordinate transformation, wherein the method uses firstly obtaining a tendency obtained by a three-dimensional laser scanner and a tendency measured by a geological compass to calculate the difference between the tendency, obtaining a relationship between coordinates under the scanner and geodetic coordinates, converting the coordinates into geodetic coordinates, and finally calculating the tendency and inclination angle. The three coordinate axes of the new point cloud coordinate system obtained by the coordinate change method of the present application are parallel to the three coordinate axes of the geodetic coordinate system, and is a relative geodetic coordinate system. The coordinate system does not give the accurate geodetic coordinates of the point cloud, but it can be directly used to identify the occurrence information of the geological structure plane, the length of the trace, the interval of the structure plane, and other geometric parameters in the point cloud, which can meet the requirements of the rapid acquisition of the deep underground engineering information and the identification and extraction of the geological structure plane information.

In summary, in the present embodiment, before performing laser scanning on a measured surface, the third plate surface is close to the measured surface by adjusting the target device, and the bubbles of the first circular level and the second circular level are in a centered state; acquiring point cloud data of the measured surface and the target device via a three-dimensional laser scanner; respectively extracting point cloud coordinates of the three cross targets from the point cloud data, and acquiring the first tendency of the third plate surface from the digital display of three-dimensional electronic compass; determining the second tendency of the third plate surface according to the point cloud coordinates; converting the coordinates in the point cloud data to geodetic coordinates according to the first tendency and the second tendency. In this scheme, the target device can be quickly and conveniently arranged in the field, and the information can be quickly obtained so as to realize the transformation from the coordinate of three-dimensional laser scanning to the geodetic coordinates.

In order to facilitate a better implementation of the method for transformation of point cloud coordinates of structure plane of deep-buried tunnel based on a target device provided by the embodiments of the present application, the embodiments of the present application also provide an equipment based on the above-mentioned target device-based coordinate transformation method for structure plane of deep-buried tunnel. The meaning of the term is the same as that in the above-mentioned method for transformation of point cloud coordinates of structure plane of deep-buried tunnel based on a target device, and reference can be made to the description in the embodiment of the method for specific implementation details.

Figure 7:
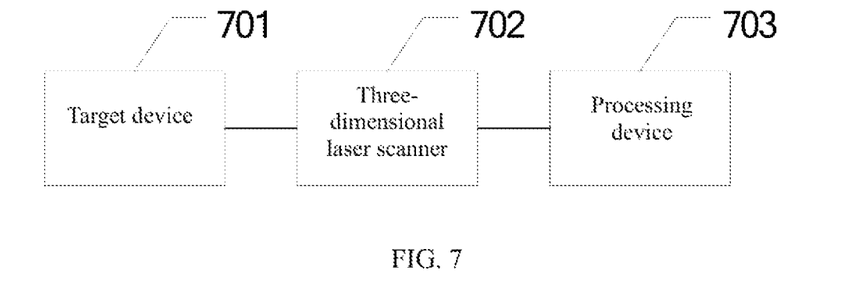
FIG. 7 is a schematic structural view of a device for transformation of point cloud coordinates of structure plane of deep-buried tunnel based on a target device provided by an embodiment of the present application.

With reference to FIG. 7, FIG. 7 is a schematic structural view of the device for transformation of point cloud coordinates of structure plane of deep-buried tunnel based on a target device provided by an embodiment of the present application, wherein the device for transformation of point cloud coordinates of structure surface of deep-buried tunnel may comprise a target device 701, a three-dimensional laser scanner 702 and a processing device 703, etc.

The target device 701 comprises a triangular target holder, a first plate surface, a second plate surface, and a third plate surface, wherein:

the first plate surface and the second plate surface are in the shape of an isosceles triangle, the third plate surface is in the shape of an isosceles trapezoid, and the triangular target holder is successively provided with a holder foot, a first circular level, a height adjuster and a direction adjuster from bottom to top;

the triangular target holder is connected to the second plate surface via the direction adjuster, the bottom edge of the second plate surface is connected to the lower bottom of the third plate surface via a folding hinge, the upper bottom of the third plate surface is connected to the bottom edge of the first plate surface via a folding hinge, the first plate surface and the second plate surface are fixedly connected via a post holder, the second circular level is provided at the central position of the first plate surface, three cross targets are provided on the third plate surface, and a digital display of three-dimensional electronic compass is provided at the central position of the third plate surface;

before performing laser scanning on a measured surface, the third plate surface is close to the measured surface by adjusting the target device 701, and the bubbles of the first circular level and the second circular level are in a centered state;

the three-dimensional laser scanner 702 is used for acquiring point cloud data of the measured surface and the target device;

the processing device 703 is used for respectively extracting point cloud coordinates of the three cross targets from the point cloud data, and acquiring the first tendency of the third plate surface from the digital display of three-dimensional electronic compass; determining the second tendency of the third plate surface according to the point cloud coordinates; converting the coordinates in the point cloud data to geodetic coordinates according to the first tendency and the second tendency.

In some embodiments, the processing device 703, when processing the second tendency step of determining the third plate surface according to the point cloud coordinates, is specifically used for:

determining the first normal vector of the third plate surface according to the point cloud coordinates;

determining the second tendency according to the first normal vector.

In some embodiments, the processing device 703, when processing the determining the second tendency step according to the first normal vector, is specifically used for:

determining the second tendency according to the first normal vector and a preset tendency calculation formula, wherein the first normal vector is $(a_1, b_1, c_1)$, wherein:

when $b_1 > 0$, the tendency calculation formula is:

$$\alpha_1 = \arccos\left(\frac{a_1}{\sqrt{a_1^2 + b_1^2}}\right),$$

wherein $\alpha_1$ is the second tendency;

when $b_1 \leq 0$, the tendency calculation formula is:

$$\alpha_1 = 2^\pi - \arccos\left(\frac{a_1}{\sqrt{a_1^2 + b_1^2}}\right).$$

In some embodiments, the processing device 703, when processing the step of converting coordinates in the point cloud data into geodetic coordinates according to the first tendency and the second tendency, is specifically used for:

determining the tendency difference according to the first tendency and the second tendency;

converting the coordinates in the point cloud data into geodetic coordinates according to the tendency difference and a preset coordinate conversion formula, wherein the coordinate conversion formula is:

$$(x'\ y'\ z'\ 1) = (x\ y\ z\ 1)\begin{bmatrix} \cos\alpha & 0 & \sin\alpha & 0 \\ 0 & 1 & 0 & 0 \\ \sin\alpha & 0 & \cos\alpha & 0 \\ 0 & 0 & 0 & 1 \end{bmatrix};$$

wherein $(x'\ y'\ z')$ is geodetic coordinate, $(x\ y\ z)$ is coordinate in the point cloud data, and $\Delta\alpha$ is the tendency difference.

In some embodiments, the processing device 703 processes, after the step of converting the coordinates in the point cloud data into geodetic coordinates according to the first tendency and the second tendency, is further specifically used for:

extracting triangle coordinates from the geodetic coordinates;

calculating the second normal vector of the triangle coordinates;

determining the third tendency according to the second normal vector and a preset tendency calculation formula.

In some embodiments, the processing device 703, after processing the second normal vector step of calculating the triangle coordinates, is further specifically used for:

determining the inclination angle of the triangle coordinates according to the second normal vector and a preset calculation formula of inclination angle, wherein the second normal vector is $(a_2, b_2, c_2)$, wherein:

the calculation formula of inclination angle is:

$$\beta = \arctan\left(\frac{\sqrt{a_2^2 + b_2^2}}{c_2}\right),$$

wherein $\beta$ is the inclination angle of the triangle coordinates.

In some examples, the direction adjuster comprises a screw bolt, a lower base, a foot screw, and an upper base, wherein the screw bolt is connected to the lower base, the lower base is connected to the foot screw, the foot screw is connected to the upper base, and the upper base is connected to the second plate surface by a fixing rod.

It should be noted that a technician in this field would have been able to clearly understand that the above-mentioned device for transformation of point cloud coordinates of structure plane of deep-buried tunnel based on a target device and the specific implementation process of each unit can refer to the corresponding description in the above-mentioned method embodiments, and for the convenience and brevity of description, the description will not be repeated.

Figure 8:
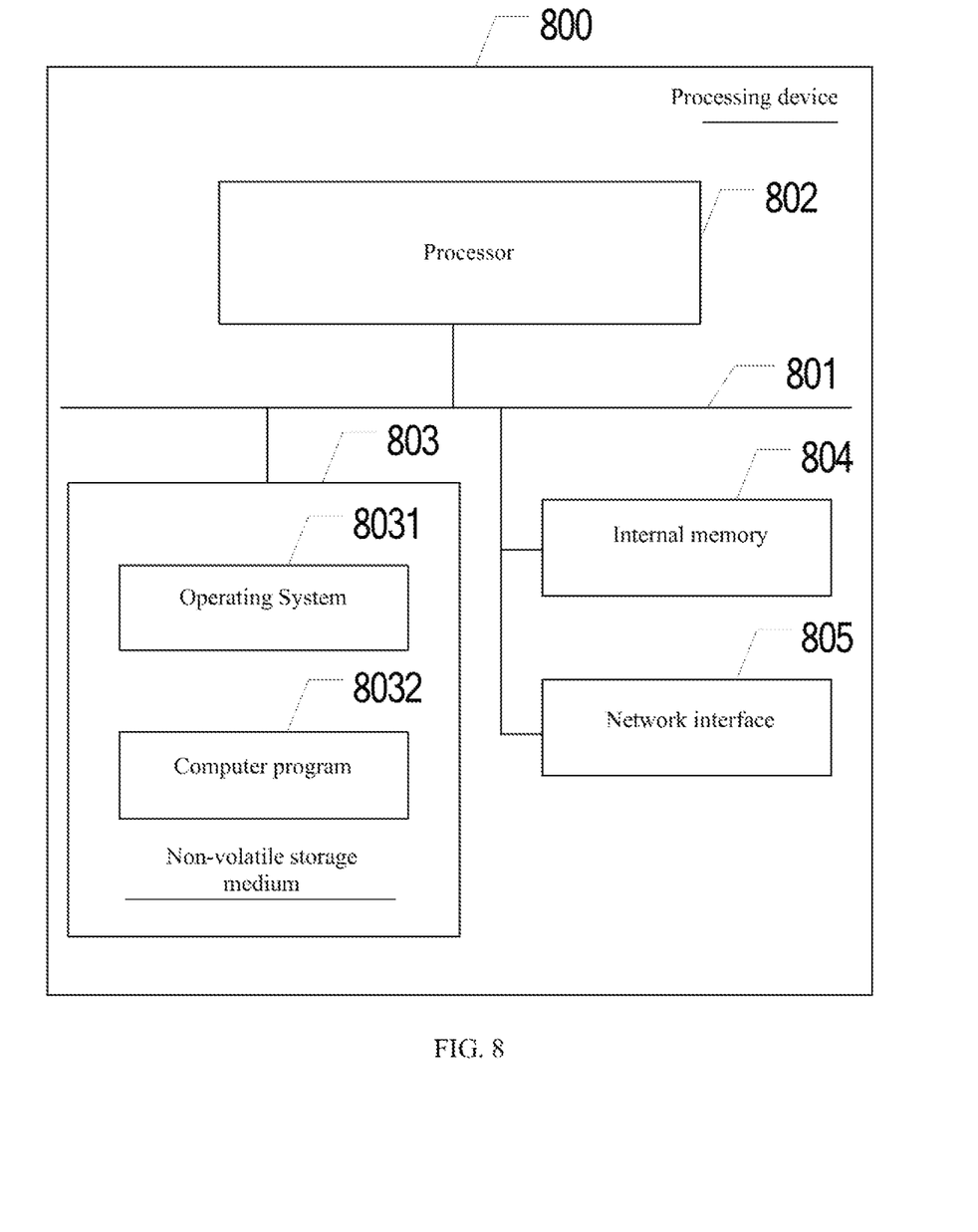
FIG. 8 is a schematic structural view of a processing device in an equipment for transformation of point cloud coordinates of structure plane of deep-buried tunnel based on a target device provided in an embodiment of the present application.

The above-mentioned device for transformation of point cloud coordinates of structure plane of deep-buried tunnel based on a target device can be implemented in the form of a computer program that can run on an equipment for transformation of point cloud coordinates of structure plane of deep-buried tunnel based on a target device, the equipment for transformation of point cloud coordinates of structure plane of deep-buried tunnel based on a target device comprising a target device, a three-dimensional laser scanner and a processing device, in particular, the computer program can run on the processing device, and the processing device is as shown in FIG. 8.

Reference is now made to FIG. 8, which is a schematic block diagram of a processing device according to an embodiment of the present application. The processing device 800 may be a terminal or a server, wherein the terminal may be an electronic equipment having a communication function, such as a smart phone, a tablet computer, a notebook computer, a desktop computer, a personal digital assistant, and wearable equipment. The server may be an independent server or a server cluster composed of a plurality of servers.

Referring to FIG. 8, the processing device 800 includes a processor 802, a memory, which may include a non-volatile storage medium 803 and an internal memory 804, and a network interface 805 connected by a system bus 801.

The non-volatile storage medium 803 may store an operating system 8031 and a computer program 8032. The computer program 8032 includes program instructions that, when executed, cause the processor 802 to perform a coverage fusion method.

The processor 802 is used to provide computing and control capabilities to support the operation of the overall processing device 800.

The internal memory 804 provides an environment for the execution of a computer program 8032 in a non-volatile storage medium 803 that, when executed by the processor 802, may cause the processor 802 to perform a coverage fusion method.

The network interface 805 is used for network communication with other equipment. It will be appreciated by the technicians in this field that the configuration shown in FIG. 8 is merely a block diagram of a portion of the configuration relevant to the solution of the present application and does not constitute a limitation on the processing device 800 to which the solution of the present application is applied, and that a particular processing device 800 may include more or fewer components than those shown in the figures, or may combine certain components, or may have a different arrangement of components.

Wherein the processor 802 is used for running a computer program 8032 stored in a memory so as to realize the following steps:

acquiring point cloud data of the measured surface and the target device via a three-dimensional laser scanner;

respectively extracting point cloud coordinates of the three cross targets from the point cloud data, and acquiring the first tendency of the third plate surface from the digital display of three-dimensional electronic compass;

determining the second tendency of the third plate surface according to the point cloud coordinates;

converting the coordinates in the point cloud data to geodetic coordinates according to the first tendency and the second tendency.

It should be appreciated that in embodiments of the present application, processor 802 may be a central processing unit (CPU), may be other general-purpose processors, a digital signal processor (DSP), an application specific integrated circuit (ASIC), a field-programmable gate array (FPGA) or other programmable logic devices, a discrete gate or transistor logic device, a discrete hardware component, etc. A general-purpose processor may be a microprocessor, but in the alternative, the processor may be any conventional processor.

It will be appreciated by those ordinary technicians in this field that all or a portion of the flow of a method in the embodiments described above may be performed by a computer program instructing associated hardware. The computer program comprises program instructions, and the computer program may be stored on a storage medium, which is a computer-readable storage medium. The program instructions are executed by at least one processor in the computer system to perform the process steps of the embodiments of the method described above.

Therefore, the present application also provides a storage medium. The storage medium may be a computer readable storage medium. The storage medium stores a computer program, wherein the computer program comprises program instructions. The program instructions, when executed by a processor, cause the processor to perform the steps of:

acquiring point cloud data of the measured surface and the target device via a three-dimensional laser scanner;

respectively extracting point cloud coordinates of the three cross targets from the point cloud data, and acquiring the first tendency of the third plate surface from the digital display of three-dimensional electronic compass;

determining the second tendency of the third plate surface according to the point cloud coordinates;

converting the coordinates in the point cloud data to geodetic coordinates according to the first tendency and the second tendency.

The storage medium may be a variety of computer-readable storage media such as a U-disk, a removable hard disk, a read-only memory (ROM), a magnetic disk, or an optical disk that can store program codes.

Those technicians in this field will appreciate that the elements and algorithm steps of the examples described in connection with the embodiments disclosed herein may be implemented as electronic hardware, computer software, or combinations of both, and that the elements and steps of the examples have been described above generally in terms of their functionality in order to clearly illustrate this interchangeability of hardware and software. Whether such functionality is implemented as hardware or software depends upon the particular application and design constraints imposed on the implementation. Skilled artisans may implement the described functionality in varying ways for each particular application, but such implementation decisions should not be interpreted as causing a departure from the scope of the present application.

In the several embodiments provided in the present application, it should be understood that the disclosed apparatus and methods may be implemented in other ways. For example, the apparatus embodiments described above are merely illustrative. For example, the division of each unit is merely a logic function division, and there may be other division modes in actual implementation. For example, elements or components may be combined or integrated into another system, or some features may be omitted, or not performed.

The steps in the method of the embodiments of the present application can be sequentially adjusted, combined, and deleted according to actual needs. The units in the device in the embodiments of the present application can be combined, divided, and deleted according to actual needs. In addition, each functional unit in various embodiments of the present application may be integrated in one processing unit, may be physically present in each unit alone, or may be integrated into one unit by two or more units.

The integrated unit, if implemented in the form of a software functional unit and sold or used as a stand-alone product, may be stored in a storage medium. Based on such an understanding, the technical solution of the present application can be substantially or partly contributed to the prior art, or all or part of the technical solution can be embodied in the form of a software product stored in a storage medium, comprising a plurality of instructions for causing a computer equipment (which may be a personal computer, a terminal, or network equipment, etc.) to perform all or part of the steps of the method of the various embodiments of the present application.

What has been described above is merely a specific embodiment of the present application, and the scope of protection of the present application is not limited thereto. Various equivalent modifications or alterations that are within the scope of this disclosure will readily occur to those technicians in this field and are intended to be within the scope of this disclosure. Accordingly, the protection scope of the present application is as set forth in the claims below.

What is claimed is:

1. A method for transformation of point cloud coordinates of structure plane of deep-buried tunnel based on a target device, wherein the target device comprises a triangular target holder, a first plate surface, a second plate surface, and a third plate surface, wherein:
the first plate surface and the second plate surface are in the shape of an isosceles triangle, the third plate surface is in the form of an isosceles trapezoid; the triangular target holder is equipped, in ascending order, with a holder foot, a first circular level, a height adjuster, and a direction adjuster;
the triangular target holder is linked to the second plate surface using a direction adjuster, the bottom edge of the second plate surface is connected to the lower bottom of the third plate surface via a folding hinge, while the upper bottom of the third plate surface is connected to the bottom edge of the first plate surface via a folding hinge; the first plate surface and the second plate surface are fixedly connected via a post holder, and the central position of the first plate surface houses the second circular level; the third plate surface features three cross targets, and a three-dimensional electronic compass with a digital display is situated at the center of the third plate surface;
prior to conducting laser scanning on a surface being measured, the target device is adjusted to bring the third plate surface close to the measured surface, ensuring that bubbles in the first circular level and the second circular level are centered;
acquiring point cloud data of both the measured surface and the target device is achieved through the utilization of a three-dimensional laser scanner;
individually retrieving the point cloud coordinates of the three cross targets from the point cloud data, and obtaining the initial orientation of the third plate surface from the digital display of the three-dimensional electronic compass;
determining the second tendency of the third plate surface based on the point cloud coordinates;
converting the coordinates in the point cloud data to geodetic coordinates according to the first tendency and the second tendency.

2. The method of claim 1, wherein determining the second tendency of the third plate surface according to the point cloud coordinates comprises:
determining the first normal vector of the third plate surface according to the point cloud coordinates;
determining the second tendency according to the first normal vector.

3. The method of claim 2, wherein determining the second tendency according to the first normal vector comprises:
determining the second tendency according to the first normal vector and a preset tendency calculation formula, wherein the first normal vector is $(a_1, b_1, c_1)$, wherein:
when $b_1 > 0$, the tendency calculation formula is:

$$\alpha_1 = \arccos\left(\frac{a_1}{\sqrt{a_1^2 + b_1^2}}\right),$$

wherein $\alpha_1$ is the second tendency;

when $b_1 \leq 0$, the tendency calculation formula is:

$$\alpha_1 = 2\pi - \arccos\left(\frac{a_1}{\sqrt{a_1^2 + b_1^2}}\right).$$

4. The method of claim 1, wherein the converting the coordinates in the point cloud data to geodetic coordinates according to the first tendency and the second tendency comprises:
determining the tendency difference according to the first tendency and the second tendency;
converting the coordinates in the point cloud data into geodetic coordinates according to the tendency difference and a preset coordinate conversion formula, wherein the coordinate conversion formula is:

$$(x'\ y'\ z'\ 1) = (x\ y\ z\ 1)\begin{bmatrix}\cos\Delta\alpha & 0 & \sin\Delta\alpha & 0\\ 0 & 1 & 0 & 0\\ \sin\Delta\alpha & 0 & \cos\Delta\alpha & 0\\ 0 & 0 & 0 & 1\end{bmatrix};$$

wherein (x' y' z') is geodetic coordinate, (x y z) is coordinate in the point cloud data, and $\Delta\alpha$ is the tendency difference.

5. The method of claim 1, wherein after converting the coordinates in the point cloud data to geodetic coordinates according to the first tendency and the second tendency, the method further comprises:
extracting triangle coordinates from the geodetic coordinates;
calculating the second normal vector of the triangle coordinates;
determining the third tendency according to the second normal vector and a preset tendency calculation formula.

6. The method of claim 5, wherein after calculating the second normal vector of the triangle coordinates, the method further comprises:
determining the inclination angle of the triangle coordinates according to the second normal vector and a preset calculation formula of inclination angle, wherein the second normal vector is $(a_2, b_2, c_2)$, wherein:
the calculation formula of inclination angle is:

$$\beta = \arctan\left(\frac{\sqrt{a_2^2 + b_2^2}}{c_2}\right),$$

wherein $\beta$ is the inclination angle of the triangle coordinates.

7. The method of claim 1, wherein the direction adjuster comprises a screw bolt, a lower base, a foot screw, and an upper base, wherein the screw bolt is connected to the lower base, the lower base is connected to the foot screw, the foot screw is connected to the upper base, and the upper base is connected to the second plate surface by a fixing rod.

8. A device for transformation of point cloud coordinates of structure plane of deep-buried tunnel based on a target device, comprising a target device, a three-dimensional laser scanner, and a processing device, wherein:
the target device comprises a triangular target holder, a first plate surface, a second plate surface, and a third plate surface, wherein:

the first plate surface and the second plate surface are in the shape of an isosceles triangle, the third plate surface is in the shape of an isosceles trapezoid, and the triangular target holder is successively provided with a holder foot, a first circular level, a height adjuster and a direction adjuster from bottom to top the triangular target holder is connected to the second plate surface via a direction adjuster, the bottom edge of the second plate surface is connected to the lower bottom of the third plate surface via a folding hinge, the upper bottom of the third plate surface is connected to the bottom edge of the first plate surface via a folding hinge, the first plate surface and the second plate surface are fixedly connected via a post holder, the second circular level is provided at the central position of the first plate surface, three cross targets are provided on the third plate surface, and a digital display of three-dimensional electronic compass is provided at the central position of the third plate surface;

before performing laser scanning on a measured surface, the third plate surface is close to the measured surface by adjusting the target device, and bubbles of the first circular level and the second circular level are in a centered state;

the three-dimensional laser scanner is used for acquiring point cloud data of the measured surface and the target device;

the processing device is used for respectively extracting point cloud coordinates of the three cross targets from the point cloud data, and acquiring the first tendency of the third plate surface from the digital display of three-dimensional electronic compass; determining the second tendency of the third plate surface according to the point cloud coordinates; converting the coordinates in the point cloud data to geodetic coordinates according to the first tendency and the second tendency.

9. An equipment for transformation of point cloud coordinates of structure plane of deep-buried tunnel based on a target device, comprising a target device, a three-dimensional laser scanner, and a processing device, wherein the processing device comprises a processor and a memory, wherein a computer program is stored in the memory, and the processor executes the method for transformation of point cloud coordinates of a deep-buried tunnel structure plane based on a target device of claim 1 when calling the computer program in the memory.

\* \* \* \* \*